G. TRYON.
Tire-Adjuster.
No. 198,258.   Patented Dec. 18, 1877.
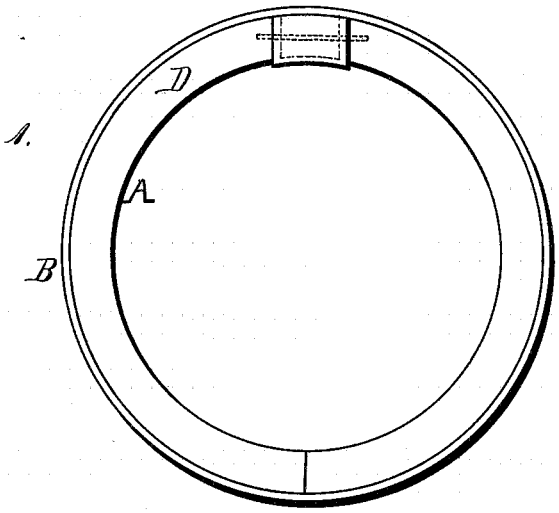
Fig. 1.
Fig. 3.
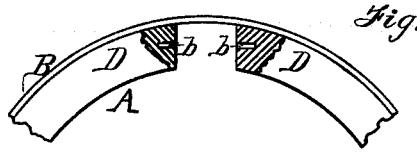
Fig. 2.
Witnesses:
Chas. C. Gill
W. B. Magruder
Inventor:
George Tryon
By his Atty.
Cox & Cox

UNITED STATES PATENT OFFICE.

GEORGE TRYON, OF ASHTABULA, OHIO.

IMPROVEMENT IN TIRE-ADJUSTERS.

Specification forming part of Letters Patent No. 198,258, dated December 18, 1877; application filed October 26, 1877.

*To all whom it may concern:*

Be it known that I, GEORGE TRYON, of Ashtabula, in the county of Ashtabula and State of Ohio, have invented a new and useful Improvement in Tire-Adjusters, of which the following is a specification, reference being had to the accompanying drawings.

The invention relates to an improvement in tire-adjusters; and consists in the devices hereinafter fully described, the object being to provide a suitable automatic means for compensating for the contraction or expansion of wagon-wheels.

Figure 1 is a plan view of a device embodying the elements of the invention. Fig. 2 is a broken detached view of same, with the packing and sleeve removed. Fig. 3 represents detached views of the sleeve and packing.

In the accompanying drawings, A represents a wagon-wheel, provided with tire B and fellies D, the ends of which are properly separated, to receive the rubber or other elastic packing $a$, and are supplied with corresponding sockets $b$, which are of sufficient size to retain the ends of the pin $d$, and permit it to be readily inserted or removed. The pin $d$ passes transversely through the packing $a$, and, when the ends of the pin are in their respective sockets, secures the same in position between the ends of the fellies.

The sleeve $e$ may be fastened to the wheel in any suitable manner, and is furnished to prevent the rubber being affected by the weather, and to exclude all dirt from the joint formed by the junction of the fellies.

It is manifest that when the parts composing the wheel contract, the rubber will expand, filling the joint and retaining the fellies firmly in position, and also that in damp weather the expansion of the fellies will contract the rubber. Thus a means is provided whereby the contraction or expansion of the wheel will be automatically taken up, and the fellies retained in proper position.

What I claim as my invention, and desire to secure by Letters Patent, is—

1. An automatic tire-adjuster, consisting of an elastic packing, $a$, placed between the fellies D, and mounted on a pin, $d$, substantially as set forth.

2. The packing $a$, mounted on pin $d$, and placed between the fellies D, provided with sockets $b$, in combination with the sleeve $e$, substantially as expressed.

In testimony that I claim the foregoing improvement in tire-adjusters, as above described, I have hereunto set my hand this 20th day of September, 1877.

GEORGE TRYON.

Witnesses:
E. G. PIERCE,
N. HUBBARD.